United States Patent [19]

Joyce, Jr.

[11] 4,201,273

[45] May 6, 1980

[54] VEHICLE AXLE SUSPENSION SYSTEM

[75] Inventor: Hardin Joyce, Jr., Springfield, Ill.

[73] Assignee: Fiat-Allis Construction Machinery, Inc., Deerfield, Ill.

[21] Appl. No.: 883,804

[22] Filed: Mar. 6, 1978

[51] Int. Cl.² .............................................. B62D 1/00
[52] U.S. Cl. ..................................... 180/12; 180/134; 280/492
[58] Field of Search ................. 180/12, 134, 135, 136, 180/137, 138, 139; 280/702, 111, 112 R, 492, 494

[56] References Cited

U.S. PATENT DOCUMENTS

| | | | |
|---|---|---|---|
| 3,118,686 | 1/1964 | McAdams | 280/702 |
| 3,449,845 | 6/1969 | Jessen | 180/14 R |
| 3,524,513 | 8/1970 | Williams | 280/111 |
| 3,549,168 | 12/1970 | Swanson | 280/702 |
| 3,827,518 | 8/1974 | Kuhl | 180/12 |
| 3,865,205 | 2/1975 | Swanson | 180/12 |
| 4,045,050 | 8/1977 | Hawk | 280/492 |

*Primary Examiner*—Richard A. Bertsch
*Assistant Examiner*—John A. Carroll
*Attorney, Agent, or Firm*—August E. Roehrig, Jr.; Robert A. Brown

[57] ABSTRACT

A tractor scraper suspension system having a tractor drive wheel axle frame pivotally connected to a tractor main frame to permit vertical movement of the tractor drive wheels relative to the tractor. A first pair of hydraulic cylinders is coupled between the tractor drive wheel axle frame and the tractor main frame to control and dampen such vertical bounce movement. A pair of arms extends transversely of an axis extending longitudinally of the tractor scraper and are included in a hitch assembly and operatively connected to the tractor drive wheel axle frame through a second pair of hydraulic cylinders for supplementing the first pair of hydraulic cylinders in controlling the vertical movement between the tractor drive wheels and to dampen tilting or rolling motion between the tractor portion and the trailer portion about their common longitudinally extending axis. A pressurized hydraulic system including accumulators, a source of fluid pressure, fluid control valves and restrictor orifices are coupled in fluid communication with the pairs of hydraulic cylinders to thereby improve the riding characteristics of the tractor scraper when encountering bounce, pitch or rolling conditions.

15 Claims, 5 Drawing Figures

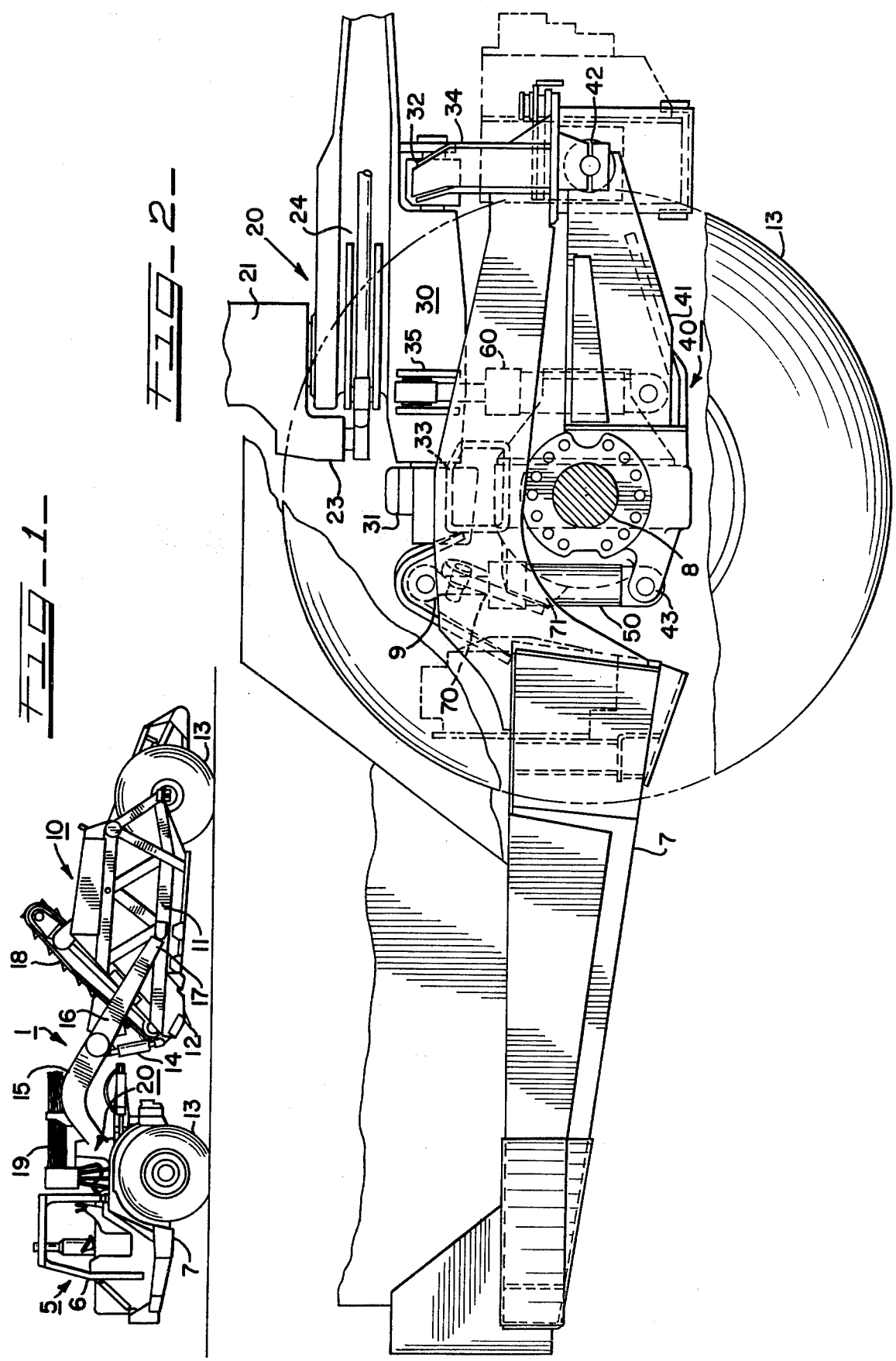

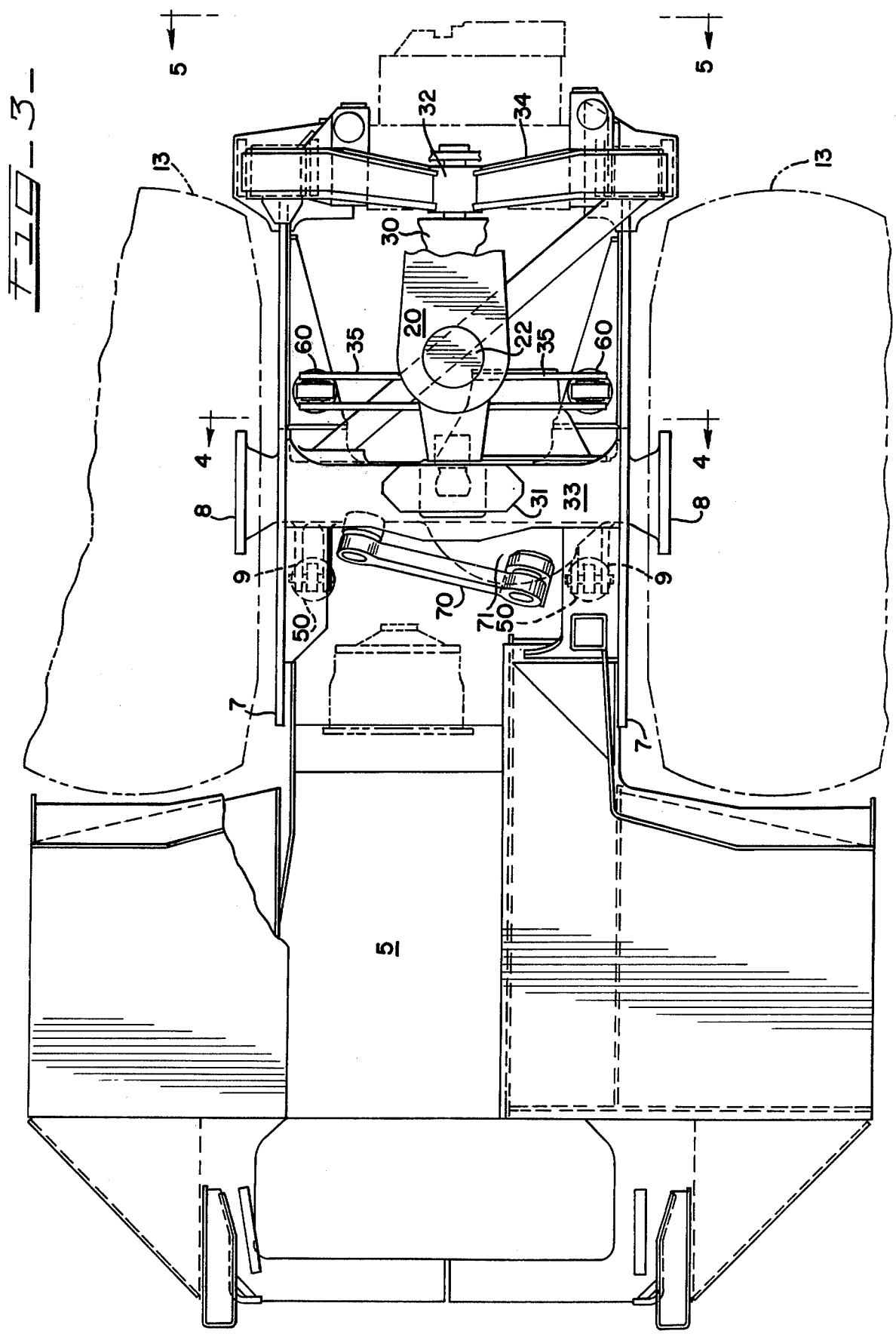

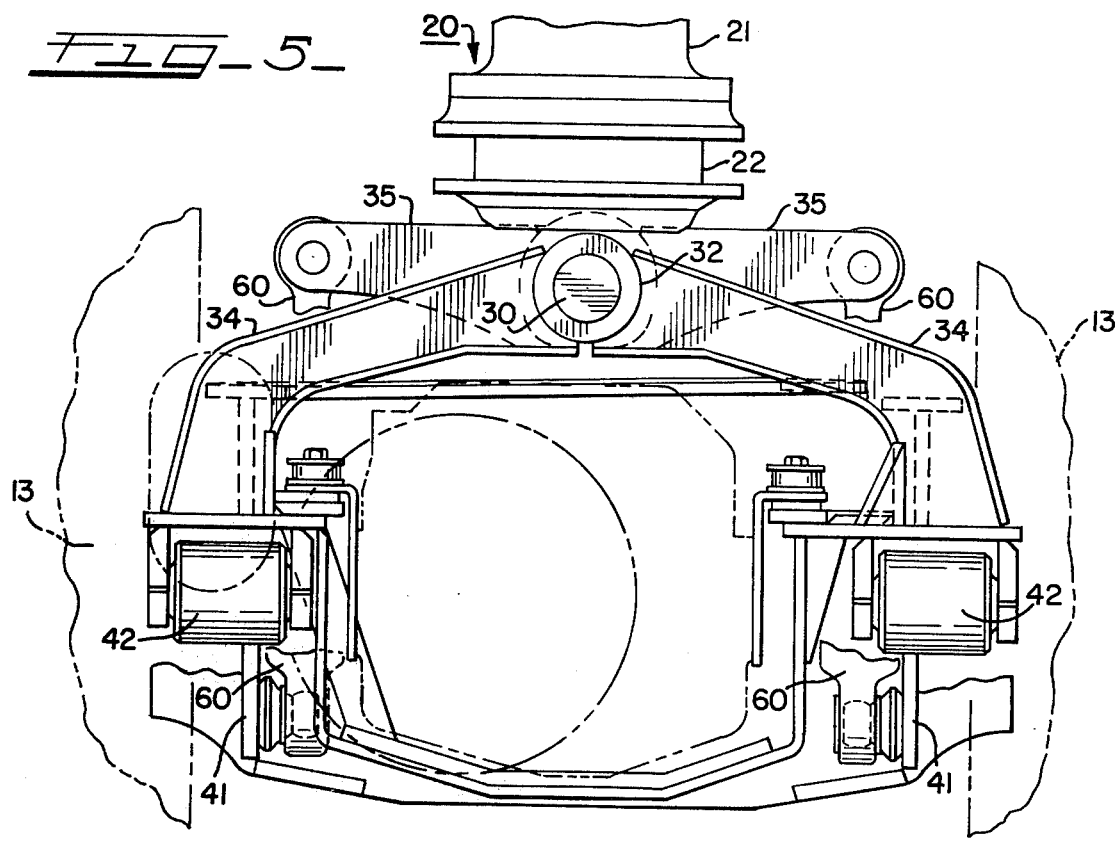
FIG-5-
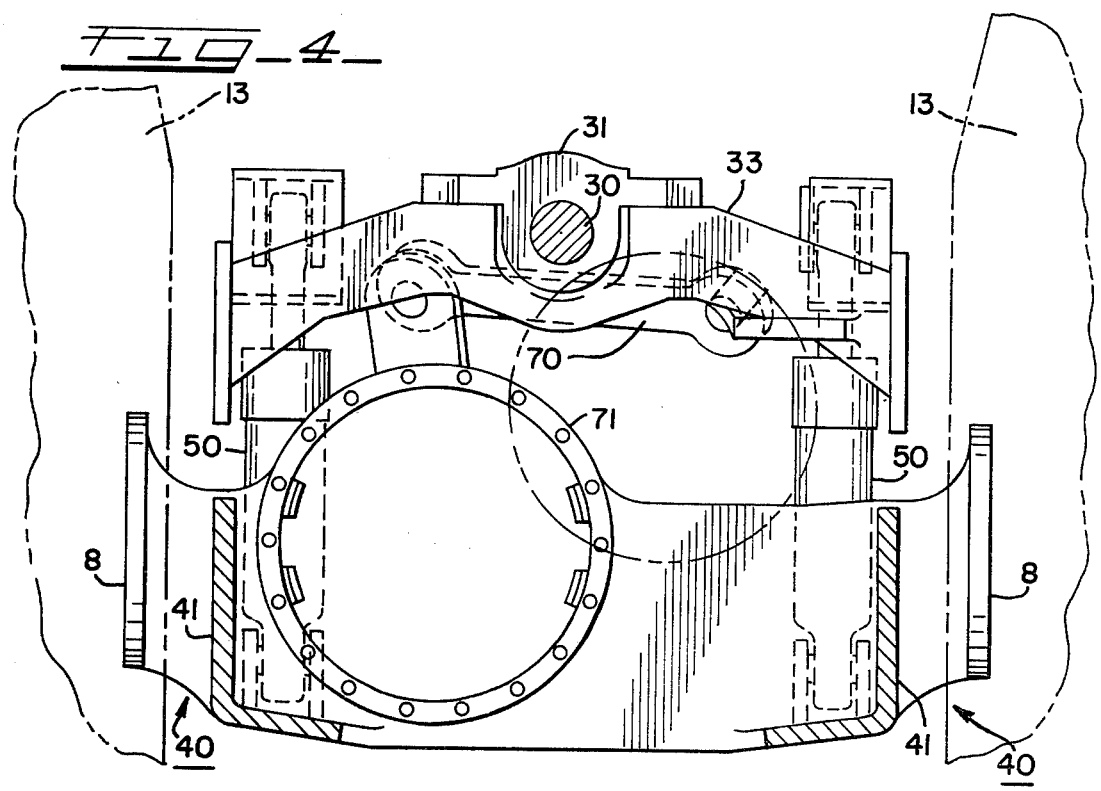
FIG-4-

4,201,273

VEHICLE AXLE SUSPENSION SYSTEM

BACKGROUND OF THE INVENTION

This invention relates in general to vehicle suspension systems and, in particular, to a suspension system especially useful for a four-wheel, two-axle articulated tractor scraper.

More specifically, but without restriction to the particular use which is shown and described, this invention relates to a vehicle suspension system for use with a four-wheel, two-axle earthmoving scraper combination for dampening bouncing, pitching and rolling motions encountered during operation.

Articulated wheel or tractor scrapers are used for many applications in the construction industry wherein it is necessary to transport heavy loads of material such as dirt and rock over terrain from one location to another, such as in levelling or filling construction or highway sites. Such wheel or tractor scrapers comprise a two-wheel tractor portion and a two-wheel trailer portion which are articulated about a combined draft and steering coupling or hitch formed between the tractor and trailer. The two units are interconnected by a yoke attached to the trailer which is pivotally mounted on a king pin coupling of the tractor. The tractor scraper is steered by turning the tractor portion with respect to the trailer portion about a vertically disposed articulation pivot axis formed by the interconnection through the use of hydraulic jacks connected between the two portions of the vehicle.

In operating articulated vehicles such as tractor scrapers, it is frequently necessary to allow the tractor and trailer portions of the vehicle to tilt relative to each other about a longitudinal axis extending through the vehicle. Such tilting or rolling is necessary to keep all of the vehicle wheels in contact with the operational surface when travelling over uneven terrain to prevent the loss of tractive power. However, the amount of tilting or rolling movement between the tractor and trailer portions of the vehicle must be controlled in order to maintain vehicle stability. While a limited amount of rolling or tilting of the two portions of the vehicle relative to each other is desirable within predetermined limits, such roll or tilt must be controlled.

In addition to roll or tilt between the tractor portion and the trailer portion of the tractor scraper, bouncing or pitching movement is frequently encountered. Such movement is believed to result from the resiliency of the tires and the weight of the scraper trailer which is suspended between the front and rear wheels of the combination and frequently occurs during hauls at relatively high vehicle speeds. Due to the large size and weight of the tractor scraper, and of the loads transported by it, ordinary shock absorbers or vibration isolators are impractical to resolve the problems created by such bouncing or pitching movement. Such bouncing or pitching movement is uncomfortable and potentially dangerous to the machine operator and, due to the large shock loads imparted by the bouncing trailer portion, can result in damage or failure of structural parts of the vehicle, particularly those closely associated with the load carrying body.

Various attempts have been made to resolve or control the rolling, bouncing and pitching conditions encountered in tractor-trailer combinations. Systems such as disclosed in U.S. Pat. No. 1,990,731 and co-pending application Ser. No. 749,318, filed Dec. 10, 1976, and entitled "Articulated Vehicle Tilt Limiting Apparatus", have attempted to resolve the tilt or roll motion problem through the use of various mechanical linkage coupled between the hitching assembly of the trailer portion and the frame of the tractor portion. Such mechanical linkage permits relative tilting or rolling movement between the two portions of the articulated vehicle within predetermined limits, and then forms a solid connection between the two units when the limits of the rolling condition have been reached.

Many attempts have been made to resolve the bouncing and pitching problems associated with tractor-trailer units. For example, attempts have been made to utilize a separate tractor drive wheel axle frame pivotally connected to the tractor main frame to allow for vertical movement of the tractor drive wheels relative to the frame. In U.S. Pat. No. 3,865,205, there is disclosed such a separate drive wheel axle frame which is pivotally connected to the front portion of the tractor main frame to extend rearwardly to a position beneath the hitch assembly. It is the object of such a coupling arrangement to obtain better weight distribution by permitting the vehicle engine to be mounted on the rear portion of the tractor unit and to allow the vehicle operator to be positioned forwardly of the engine for increased visibility.

In U.S. Pat. Nos. 3,118,686 and 3,549,168 a separate tractor drive wheel axle frame is pivotally connected to the tractor main frame and extends rearwardly to permit the tractor drive wheels to move vertically relative to the tractor main frame. Liquid containing devices are located between the tractor drive wheel axle and the tractor main frame for cushioning bouncing or pitching movement.

Another example of the use of separate frames is disclosed in U.S. Pat. No. 3,845,833 wherein a pair of tractor drive wheel axle supporting suspension arms are pivotally mounted at their rear ends and extend forwardly toward the front portion of the tractor. A pair of ride cylinders, which extend above the tractor side rails, are used to absorb the vertical deflections of the tractor drive wheel axles.

While each of these patents disclosing apparatus attempting to resolve the problems associated with bouncing and pitching movement may have been somewhat successful, such structure does not provide for controlling the rolling or tilting conditions between the tractor and trailer portions of the articulated vehicle.

SUMMARY OF THE INVENTION

It is, therefore, an object of this invention to improve vehicle suspension systems.

Another object of this invention is to improve vehicle suspension systems for off-highway articulated earthmoving equipment.

A further object of this invention is to dampen or control the bouncing, pitching and rolling movement encountered during operation of articulated vehicles.

These and other objects are attained in accordance with the present invention wherein there is provided a tractor scraper suspension system having a tractor drive wheel axle frame pivotally connected to a tractor main frame to permit vertical movement of the tractor drive wheels relative to the tractor. A first pair of hydraulic cylinders is coupled between the tractor drive wheel axle frame and the tractor main frame to control and dampen such vertical bounce movement. A pair of arms extends transversely of an axis extending longitudinally of the tractor scraper and are included in a hitch assembly and operatively connected to the tractor drive wheel axle frame through a second pair of hydraulic cylinders for supplementing the first pair of hydraulic cylinders in controlling the vertical movement between the tractor drive wheels and to dampen tilting or rolling motion between the tractor portion and the trailer portion about their common longitudinally extending axis. A pressurized hydraulic system including accumulators, a source of fluid pressure, fluid control valves and restrictor orifices are coupled in fluid communication with the pairs of hydraulic cylinders to thereby improve the riding characteristics of the tractor scraper when encountering bounce, pitch or rolling conditions.

DESCRIPTION OF THE DRAWINGS

Further objects of the invention together with additional features contributing thereto and advantages accruing therefrom, will be apparent from the following description of a preferred embodiment of the invention which is shown in the accompanying drawings with like reference numerals indicating corresponding parts throughout, wherein:

FIG. 1 is a vertical profile view of a two-axle tractor scraper utilizing the improved vehicle suspension system;

FIG. 2 is an enlarged vertical profile view of a portion of the tractor scraper illustrated in FIG. 1 with one of the drive wheels removed to better illustrate the components of the vehicle suspension system;

FIG. 3 is a horizontal profile view of the portion of the tractor scraper illustrated in FIG. 2;

FIG. 4 is a sectional view of the portion of the tractor scraper illustrated in FIG. 2 taken along lines 4—4 of FIG. 3; and FIG. 5 is a vertical profile view of a portion of the tractor scraper illustrated in FIG. 2 taken along lines 5—5 of FIG. 3.

DESCRIPTION OF THE PREFERRED EMBODIMENT

Referring now to FIG. 1 there is shown a construction machine or earthmoving vehicle 1 commonly referred to as an elevating-type tractor or wheel scraper. Although the vehicle suspension system disclosed herein may be used with various vehicles, for convenience of illustration, the preferred embodiment is illustrated with reference to its use with a four-wheel, two-axle elevating tractor scraper.

Generally, the tractor scraper 1 includes a draft or tractor unit 5 and a drawn or trailer unit 10. The trailer unit 10 includes a scraper bowl 11 supported at its rear end by a pair of wheels 13 and at its front end by a draft frame or gooseneck 15 having a pair of rearwardly extending legs 16 pivotally connected to the vertical sidewalls of the scraper bowl 11 by a transverse pivot axis 17.

The scraper bowl 11 includes a cutting edge 12 at the front end of the bottom which excavates a predetermined amount of material as the tractor scraper passes over an operational surface. The amount of material removed as the scraper passes is controlled by raising or lowering the cutting edge 12 carried by the front end of the scraper bowl 11. This positioning of the cutting edge is effected by a pair of hydraulic jacks 14 interconnecting the draft frame or gooseneck 15 at the front or leading portion of the scraper bowl 11. The jacks 14 are expanded or contracted to determine the depth of the cut of the cutting edge 12 with material being excavated passing into the scraper bowl as the scraper is moved forwardly.

With the particular type of tractor scraper illustrated, an elevator or flight-type conveyor 18 is carried within the scraper bowl 11 and positioned to the rear of the cutting edge 12 to receive the material as it is passed into the forward portion of the scraper bowl 11 to move it both rearwardly and upwardly for more even distribution.

The draft unit 5 of the tractor scraper 1 is supported by a pair of drive wheels 13 and includes an operator's cab 6 having an instrument and control panel conveniently located within the reach of the operator for controlling the vehicle as well as to monitor or adjust various accessory or auxiliary equipment of the tractor scraper for effecting desired operation. A plurality of fluid conduits or hoses 19 arise from the tractor portion 5 beneath a guard plate or housing and are turned across the draft frame or gooseneck 15 to supply fluid to actuators on the trailer portion 10 for permitting an operator in the cab 6 on the tractor portion 5 to control the functions of the trailer portion 10.

The trailer portion 10 is joined to the tractor portion 5 by means of a coupling hitch 20 which mechanically joins the tractor portion 5 with the trailer portion 10 and is illustrated in greater detail in FIGS. 2 and 3. The coupling hitch 20 pivotally connects with a pedestal housing 21 connected to the draft frame 15 and has suitable bearing surfaces for receiving a vertical king pin or coupling shaft 22 which is a part of the hitch 20. Projecting from the forward end of the pedestal housing 21 is a depending torque arm 23 which supports and forms a portion of a steering mechanism 24 for turning the tractor portion 5 and trailer portion 10 with respect to each other as provided for by the coupling hitch 20 in a manner well known in the art.

The base portion of the vertical king pin or coupling shaft 22 is secured to a horizontal hitch pin housing 30 which functions to allow the tractor portion 5 and the trailer portion 10 to tilt or roll relative to each other about a horizontal axis of the hitch pin housing 30 which extends longitudinally between the two units. A support block 31 is carried by a beam 33 secured between parallel sides of the tractor main frame 7 and a rear pin support 32 is carried by an inverted U-shape beam 34 secured between parallel sides of the tractor main frame 7 to secure a pivot pin which is journaled in the hitch pin housing 30 to the tractor portion 5 to permit relative tilt or roll between the two units.

Referring also to FIGS. 4 and 5, the vehicle suspension system includes a tractor drive wheel axle support frame 40 pivotally connected to a rear portion of the tractor main frame 7 to allow the tractor drive wheels 13 to move vertically relative to the tractor portion 5. The tractor drive wheel axle support frame 40 includes a pair of suspension support arms 41, the forward portions of which are secured to a tractor drive wheel axle 8 which carries and is operatively connected to the tractor drive wheels 13 for providing rotary driving power thereto. The power train from a vehicle engine through a torque converter, transmission, and differential system are well known to those skilled in the art and portions of this power train are shown in phantom in the drawings. The opposite ends of the suspension support arms 41 are connected to the tractor main frame 7 by means of pivot connections 42 which connect the suspension support arms 41 to the tractor main frame 7 to allow the tractor drive wheel axle supporting end to move in a vertical direction relative to the tractor portion 5. In this manner the tractor drive wheels 13 are free to move vertically relative to the tractor main frame 7 about the pivotal connections 42.

In order to oppose and dampen the vertical oscillations of the tractor drive wheels 13 relative to the tractor 5, a pair of bounce or pitch dampening hydraulic cylinders 50 are connected between a forwardly extending ear portion 43 of the suspension support arms 41 and a connecting portion 9 of the tractor main frame 7. In this manner the vertical displacement or oscillations of the tractor drive wheels 13 relative to the tractor portion 5 may be dampened through the action of the bounce or pitch dampening hydraulic cylinders 50 which may be of the type and connected in a fluid circuit, for example, in the manner disclosed in U.S. Pat. No. 3,118,686.

In order to dampen and limit the amount of roll or tilt between the tractor portion 5 and the trailer portion 10 of the tractor scraper, the hitch pin housing 30 has a pair of tilt limiting arms 35 secured thereto which extend laterally outward therefrom transverse to the longitudinally extending pivot axis. The tilt limiting arms 35 each have a roll or tilt dampening hydraulic cylinder 60 pivotally connected between the distal end of the tilt limiting arms 35 and the suspension support arms 41 of the tractor drive wheel axle support frame 40. In this manner as the tractor portion 5 and the trailer portion 10 roll or tilt relative to each other about the longitudinally extending hitch pin axis, the movement will be dampened through the action of the roll or tilt dampening cylinders 60.

While the dampening of the tilting or rolling movement between the tractor portion 5 and the trailer portion 10 of the wheel scraper 1 will continue throughout the limits of travel of a piston connected cylinder rod carried within the roll or pitch dampening cylinders 60, at such time as either of the cylinders 60 reaches the limit of travel of its respective cylinder rod a solid tilt stop coupling is formed between the tractor drive wheel axle support frame 40 and the coupling hitch 20 to prevent further tilting movement. Since the roll or tilt dampening cylinders 60 are carried between the tilt limiting arms 35 and the suspension support arms 41 of the tractor drive wheel support frame 40, the roll and tilt dampening cylinders 60 also function to dampen the vertical movement or oscillations of the tractor drive wheels 13 relative to the tractor main frame 7. With the dampening system as described in this manner both pairs of dampening cylinders 50 and 60 function to dampen such vertical movement and control bouncing and pitching motions of the wheel scraper or the pair of dampening cylinders 60 only can be provided to perform all of the dampening functions.

In order to stabilize lateral motion imposed stresses in the rear portion of the tractor main frame 7, a stabilizer link 70 is provided. The stabilizer link is pivotally connected between a portion of the tractor drive wheel axle support frame 40, for example a differential housing 71, and the beam 33 which supports the hitch coupling 20 to provide lateral stability to the tractor portion 5 and to the entire suspension system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle suspension system for use with an articulated vehicle having a tractor portion carried on a tractor main frame and a trailer portion coupled thereto by a hitching connection which allows the vehicle portions to tilt relative to each other about a coincident axis extending longitudinally through the vehicle tractor and trailer portions comprising;

axle support means pivotally connected to a tractor main frame for supporting a pair of tractor drive wheels for vertical movement relative thereto, fluid responsive cylinder means coupled between said axle support means and a tractor main frame to oppose and dampen vertical movement of said axle support means relative to said tractor main frame, hitch connection means for connecting a tractor portion of an articulated vehicle with a trailer portion of said vehicle to allow relative tilt movement therebetween about a coincident axis extending longitudinally through said portions of said vehicle, and fluid responsive cylinder means coupled between said axle support means and said hitch means to oppose and dampen tilting movement of said portions of said vehicle relative to each other.

2. The apparatus of claim 1 wherein said fluid responsive cylinder means coupled between said axle support means and said hitch means includes tilt stop means for limiting the amount of relative tilt movement between the tractor portion and the trailer portion of the vehicle.

3. The apparatus of claim 1 wherein said fluid responsive cylinder means coupled between said axle support means and said hitch means opposes and dampens vertical movement of said axle support means relative to said tractor main frame.

4. The apparatus of claim 1 wherein said axle support means comprises a pair of suspension support arms pivotally connected to the tractor main frame at one end and supporting said tractor drive wheels at the other end thereof.

5. The apparatus of claim 4 wherein said fluid responsive cylinder means coupled between said axle support means and a tractor main frame comprise a pair of hydraulic cylinders each mutually exclusively pivotally connected at one end to one of said suspension support arms and the other end of each pivotally connected to the tractor main frame.

6. The apparatus of claim 4 wherein said fluid responsive cylinder means coupled between said axle support means and a tractor main frame is pivotally connected to the free end of each one of said pair of suspension support arms.

7. The apparatus of claim 1 wherein said hitch connection means includes a pair of arms extending outwardly in a direction transverse of said longitudinal axis with the distal ends thereof pivotally connected to said fluid responsive cylinder means coupled between said axle support means and said hitch means.

8. The apparatus of claim 7 wherein said fluid responsive cylinder means coupled between said axle support means and said hitch means comprise a pair of hydraulic cylinders each mutually exclusively pivotally connected at one end to the distal end of one of said hitch arms and the other end of each pivotally connected to said axle support means.

9. The apparatus of claim 8 wherein said axle support means comprise a pair of suspension support arms pivotally connected to the tractor main frame at one end and supporting said tractor drive wheels at the free end thereof, and the other ends of said pair of hydraulic cylinders each mutually exclusively pivotally connected to one of said suspension support arms.

10. A vehicle suspension system for use with an articulated vehicle having a tractor portion carried on a tractor main frame and a trailer portion coupled thereto by a hitching connection which allows the vehicle portions to tilt relative to each other about a coincident axis extending longitudinally through the vehicle tractor and trailer portions comprising;
   axle support means pivotally connected to a tractor main frame for supporting a pair of tractor drive wheels for vertical movement relative thereto,
   hitch connection means for connecting a tractor portion of an articulated vehicle with a trailer portion of said vehicle to allow relative tilt movement therebetween about a coincident axis extending longitudinally through said portions of said vehicle, and
   fluid responsive cylinder means coupled between said axle support means and said hitch means to oppose and dampen tilting movement of said portions of said vehicle relative to each other and to oppose and dampen vertical movement of said axle support means relative to said tractor frame.

11. The apparatus of claim 10 wherein said fluid responsive cylinder means coupled between said axle support means and said hitch means includes tilt stop means for limiting the amount of relative tilt movement between the tractor portion and the trailer portion of the vehicle.

12. The apparatus of claim 10 wherein said axle support means comprises a pair of suspension support arms pivotally connected to the tractor main frame at one end and supporting said tractor drive wheels at the other end thereof.

13. A vehicle suspension system for use with an articulated vehicle having a tractor portion carried on a tractor main frame and a trailer portion coupled thereto by a hitching connection which allows the vehicle portions to tilt relative to each other about a coincident axis extending longitudinally through the vehicle tractor and trailer portions comprising
   axle support means pivotally connected to a tractor main frame for supporting a pair of tractor drive wheels for vertical movement relative thereto,
   hitch connection means for connecting a tractor portion of an articulated vehicle with a trailer portion of said vehicle to allow relative tilt movement therebetween about a coincident axis extending longitudinally through said portions of said vehicle, and
   fluid responsive cylinder means coupled between said axle support means and said hitch means to oppose and dampen tilting movement of said portions of said vehicle relative to each other and to oppose and dampen vertical movement of said axle support means relative to said tractor frame,
   said hitch connection means including a pair of arms extending outwardly in a direction transverse of said longitudinal axis with the distal ends thereof pivotally connected to said fluid responsive cylinder means coupled between said axle support means and said hitch means.

14. The apparatus of claim 13 wherein said fluid responsive cylinder means coupled between said axle support means and said hitch means comprise a pair of hydraulic cylinders each mutually exclusively pivotally connected at one end to the distal end of one of said hitch arms and the other end of each pivotally connected to said axle support means.

15. The apparatus of claim 14 wherein said axle support means comprise a pair of suspension support arms pivotally connected to the tractor main frame at one end and supporting said tractor drive wheels at the free end thereof, and the other ends of said pair of hydraulic cylinders each mutually exclusively pivotally connected to one of said suspension support arms.

* * * * *